US008337010B2

(12) United States Patent
Geller

(10) Patent No.: US 8,337,010 B2
(45) Date of Patent: Dec. 25, 2012

(54) METHOD AND APPARATUS FOR CREATING A GRAPHIC IMAGE ON A REFLECTIVE METAL SURFACE

(76) Inventor: Gary R. Geller, Ft. Lauderdale, FL (US)

( * ) Notice: Subject to any disclaimer, the term of this patent is extended or adjusted under 35 U.S.C. 154(b) by 402 days.

(21) Appl. No.: 12/711,777

(22) Filed: Feb. 24, 2010

(65) Prior Publication Data

US 2011/0203473 A1 Aug. 25, 2011

(51) Int. Cl.
*B41J 2/01* (2006.01)
*B29C 33/38* (2006.01)

(52) U.S. Cl. ........ 347/105; 347/102; 428/32.1; 264/494

(58) Field of Classification Search .................. 347/100, 347/102, 103, 106, 107, 108, 109, 105, 101, 347/99, 95, 96, 20, 21, 9; 264/494, 227, 264/39, 130, 131, 238; 428/195, 32.1; 427/133; 425/385

See application file for complete search history.

(56) References Cited

U.S. PATENT DOCUMENTS 3,121,642 A * 2/1964 Biskup .......................... 427/205
3,759,753 A 9/1973 Becca et al.
3,837,881 A * 9/1974 Hix ............................... 427/270
7,372,145 B2 5/2008 Silverbrook
2004/0166334 A1 8/2004 Kawabata
2004/0222304 A1 11/2004 Adams et al.
2004/0247732 A1* 12/2004 Walk ............................. 425/385
2005/0132909 A1* 6/2005 Lutz ................................ 101/41
2006/0081144 A1 4/2006 Truong
2006/0134318 A1 6/2006 Hudd et al.
2006/0275590 A1* 12/2006 Lorenz et al. .............. 428/195.1
2007/0068898 A1* 3/2007 Lorenz ............................ 216/27
2007/0166652 A1 7/2007 Komatsu et al.
2007/0237899 A1 10/2007 Sawoska et al.
2007/0251403 A1 11/2007 St. John
2009/0104367 A1 4/2009 Simon
2009/0226605 A1 9/2009 Chopra et al.

* cited by examiner

*Primary Examiner* — Manish S Shah

(57) ABSTRACT

A method for creating a graphic image on a reflective metal surface. A digital representation of the graphic image in a negative form is created on a computer and stored in memory. The negative image is then sent to an inkjet printer, where ultraviolet light curable ink representative of the negative image is printed onto the reflective metal surface using the inkjet printer. The portions of the reflective metal surface that are not covered with the ink remain exposed. The reflective metal in the exposed areas is mechanically scuffed to render it less reflective and visually distinct from the covered portions. The ultraviolet light curable ink is then removed with a high pressure water spray to reveal the graphic image made by the contrast between the original reflective metal and the scuffed metal surfaces.

19 Claims, 4 Drawing Sheets

FIG. 6
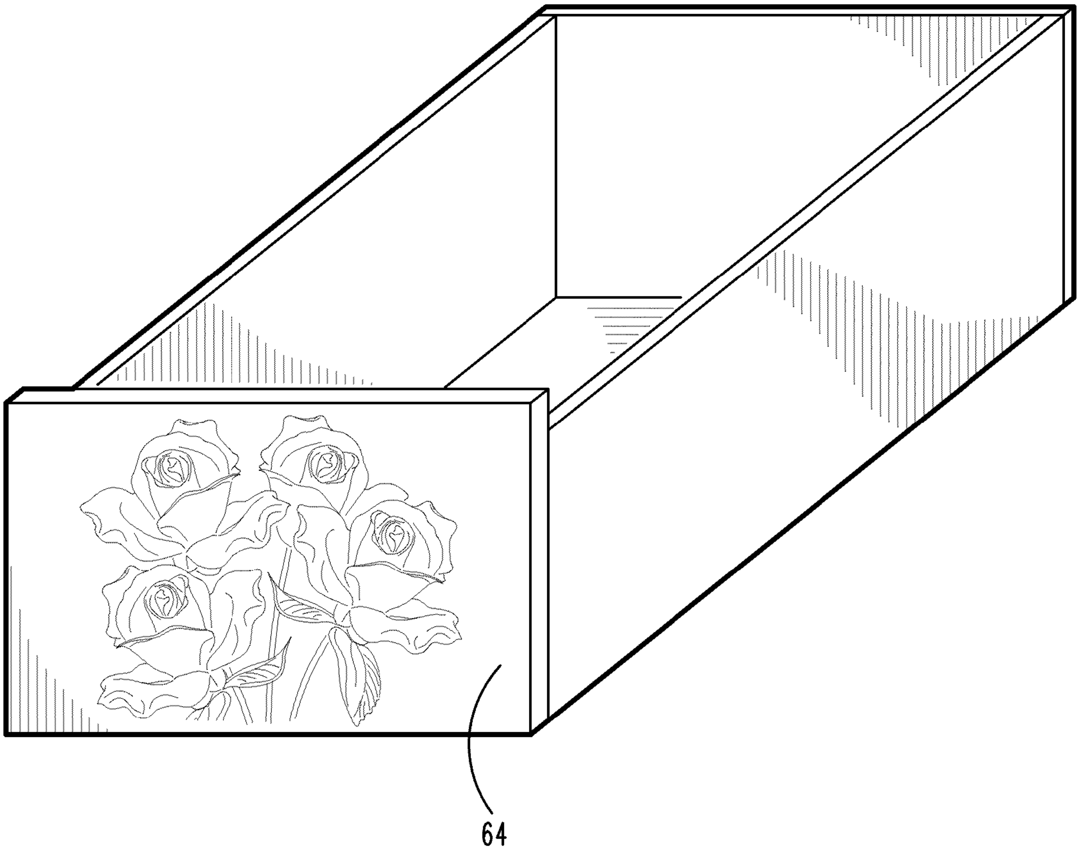

METHOD AND APPARATUS FOR CREATING A GRAPHIC IMAGE ON A REFLECTIVE METAL SURFACE

FIELD OF THE INVENTION

The present invention relates generally to forming graphic images, and more particularly to a method of forming a graphic image on a reflective metal sheet.

BACKGROUND

Graphic images and designs have been formed on metal surfaces for a variety of uses for many years. One common practice employed in the electronics industry is to create printed circuit boards using a technique known as "print and etch". This method uses a polymeric photoresist that is laminated onto a copper clad dielectric medium. The photoresist is photopolymerized with an ultraviolet light in selected areas, and the unpolymerized resist is washed off with chemicals, exposing the copper in certain areas. The exposed copper is then etched with strong acids to dissolve and chemically remove the copper. The remaining polymerized resist is then removed with additional harsh and environmentally damaging chemicals, to yield the patterned circuit. Numerous variations of this technique are used today thoughout various industries to provide patterned metal surfaces for a wide variety of uses. The problem with all of these techniques is that they require expensive equipment, they use large quantities of toxic chemicals that are harmful to the environment, and thus are subject to strict government regulation.

Alternate techniques seek to provide visual designs on metal surfaces by mechanically carving into the metal surface, removing some measurable amount of material by cutting, burning, or otherwise vaporizing the metal using cutting tools or lasers. Still other techniques emboss or stamp the metal surface to create a design.

Each of these techniques removes metal or distends the metal in one way or another, creating a three dimensional surface with measurable texture. They are limited in that they can only be used on metal substrates of sufficient thickness to allow for metal removal. And they are costly and slow. There is a continuing need to improve the quality, reduce the cost, and to simplify the manufacture of graphic images on a two dimensional metal surface that does not harm the environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 6 is an example of a door or drawer, in accordance with some embodiments of the invention.

Figure 1:
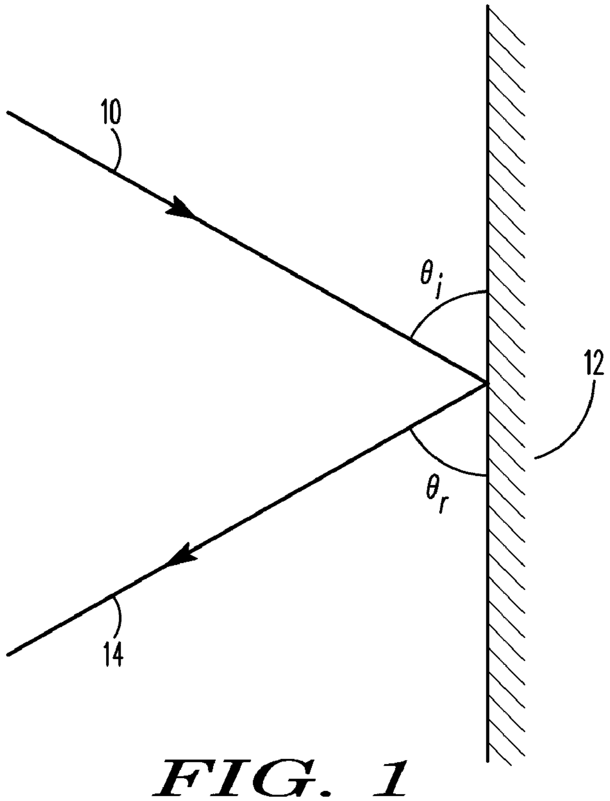
FIG. 1 is a schematic of specular reflected light, in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method and apparatus components related to forming a graphic image on a reflective metal surface, which comprises a two-dimensional metal substrate, a substantially planar metal substrate, or other metal substrate. Accordingly, the apparatus components and methods have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method for creating a graphic image on a reflective metal surface in accordance with various embodiments will now be described. A digital representation of the graphic image is created on a computer and stored in memory. The digital file is then sent to an inkjet printer, where ultraviolet light curable ink representative of the image, or optionally of a negative version of the image, is printed onto the reflective metal surface using the inkjet printer. The portions of the reflective metal surface that are not covered with the ink remain exposed. The reflective metal in the exposed areas is mechanically scuffed to render it less reflective and visually distinct from the covered portions. The ultraviolet light curable ink is then removed with a high pressure water spray to reveal the graphic image made by the contrast between the original reflective metal surface and the scuffed metal surface.

Referring now to FIG. 1, a flowchart depicting one embodiment of the invention, a graphic image is created on a reflective metal surface.

Figure 2:
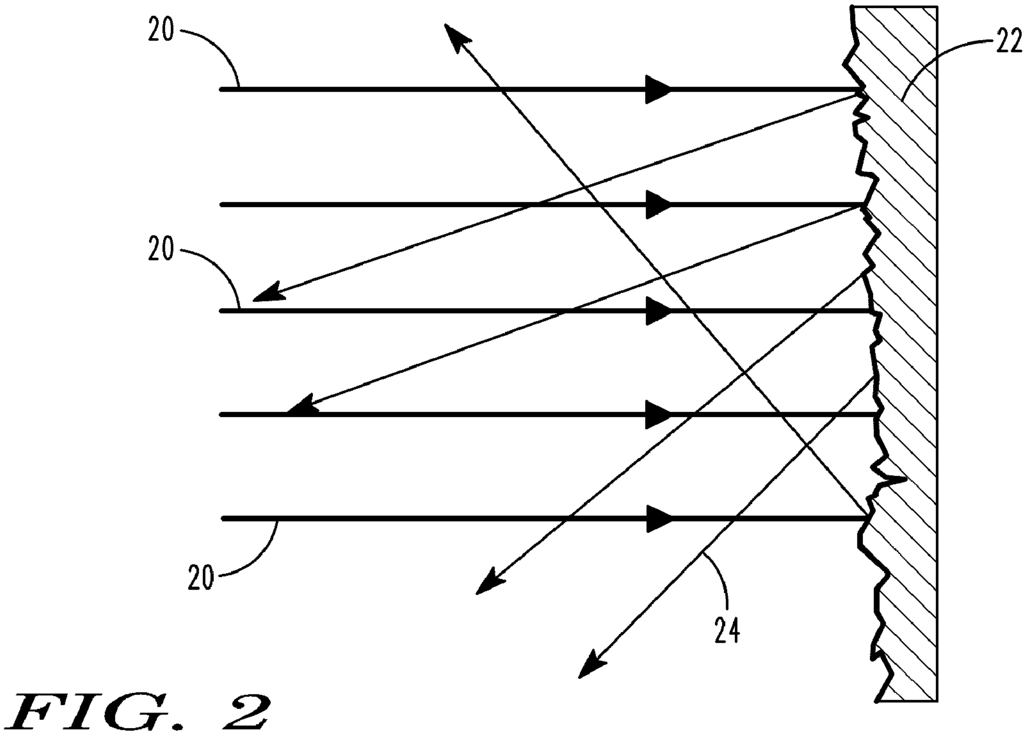
FIG. 2 is a schematic of diffuse reflected light, in accordance with some embodiments of the invention.

The terms "reflective", "polished", and "shiny", as interchangeably used herein refer to a surface that is capable of specular reflection. Referring now to FIG. 1, the law of reflection says that for specular reflection the angle 10 incident to the surface 12 equals the angle 14 reflected. Specular reflection forms an image. The most well known form of specular reflection is a mirror. Although all surfaces reflect light to a greater or lesser extent, diffuse reflection (FIG. 2) does not produce an image. When incident light 20 rays strike a rough or granular surface 22, it bounces off in all directions 24 due to the microscopic irregularities of the interface. Thus, an image is not formed. This is called diffuse reflection. I find that metal that is polished to have a smooth, shiny surface provides adequate specular reflectance for use in forming a graphic image in accordance with my invention, in contrast to metal that diffuses light creating a dull or matte appearance. Brushed metal, for example, does not provide specular reflectance, but diffuses the light. Stainless steel is particularly suitable, although other metal sheets or sheets coated or clad with copper, aluminum, steel, nickel, and their alloys may also be used alone or in combination.

Figure 3:
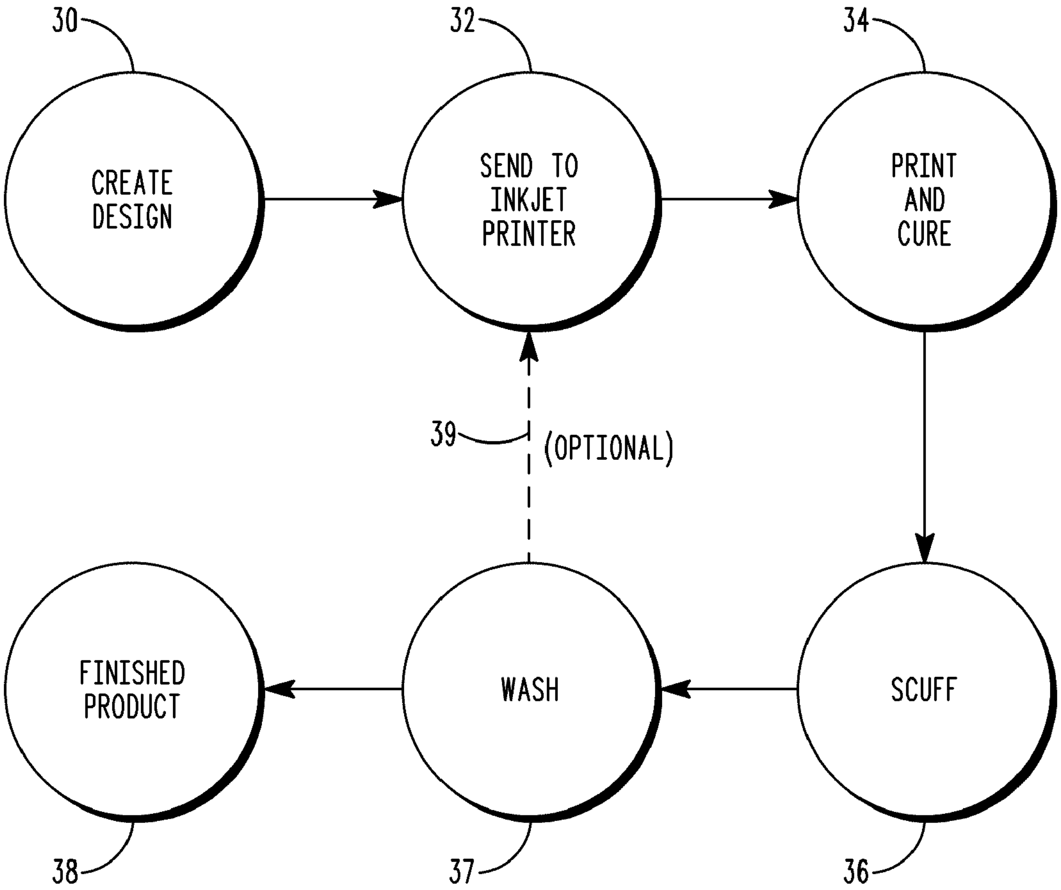
FIG. 3 is a flowchart illustrating a sequence of events, in accordance with some embodiments of the invention.
Figure 4:
FIG. 4 is an example of a graphic design and the design that is printed by an inkjet printer, in accordance with some embodiments of the invention.
Figure 5:
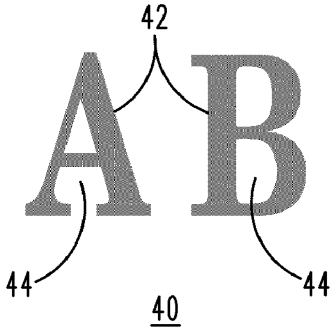
FIG. 5 is a magnified view of a halftone, in accordance with some embodiments of the invention.
Figure 5:
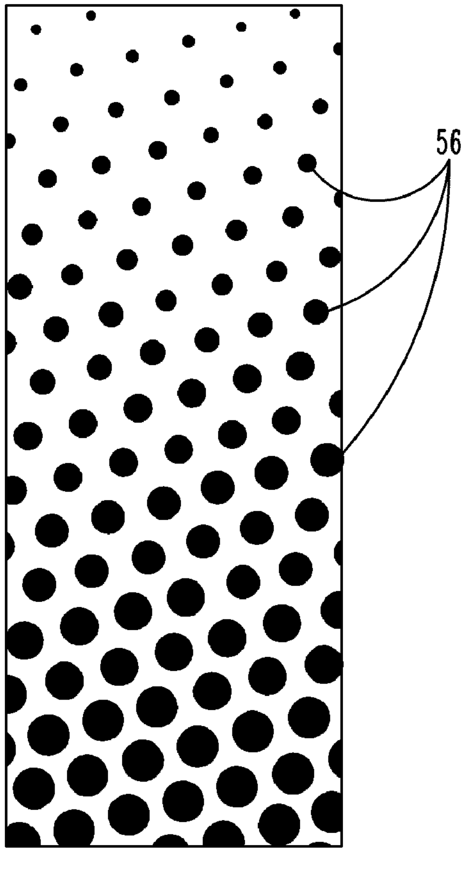

Referring now to FIG. 3, a flowchart depicting one embodiment of the invention, a graphic image formed on a two dimensional reflective surface begins 30 with a design stored in a computer memory in digital representation. Although the image might be created in any number of conventional ways, for example drawn on paper by a human hand using conventional tools such as pencils or markers, it ultimately is converted to a digital representation, by scanning, for example. More modern tools such as graphic arts design software store the image directly in digital format. Referring now to FIG. 4, the desired visual design 40 is created such that there are positive areas 42, representing the image that the human eye perceives, and negative areas 44, representing the "space" between the positive areas. Degrees of shading can be simulated by using halftone techniques in conventional manner. Where continuous tone imagery contains an infinite range of greys, the halftone process reduces visual reproductions to a binary image that is printed with only one color of ink. This binary reproduction relies on a basic optical illusion, that these tiny halftone dots are blended into smooth tones by the human eye. FIG. 5 is a magnified example of a halftone. Although circular dots 56 are shown, other shapes are considered to be within the scope of the invention. Referring back to FIG. 3, the visual design stored in computer memory is then ported 32 to an inkjet printer, where a negative image of the visual design can be printed on the reflective metal surface. By negative image, I mean an image (FIG. 4) 46 that is the "opposite" of the desired visual design, where the positive portion and negative portions are reversed. The negative image can be created or stored in either the computer or in the inkjet printer. The terms "ink jetted image", "ink jettable", and "ink jet printed" all refer to an image created with an ink jet printing process employing a radiation curable ink composition. The image may be text, graphics, coding (e.g., bar coding), etc., being comprised of a single color, typically black. It has been found that inks cured by ultraviolet (UV) light, used in the printing industry for printing long lasting images such as outdoor signs, when polymerized or cured on the reflective substrate, can function as an effective "resist" for my invention. The metal substrate is placed on the printing bed of the inkjet printer after which the inkjet printer receives information from the computer to determine the precise position of the substrate on the printing bed. During the printing process 34, a printer head of the inkjet printer moves along the substrate leaving droplets of the UV-light curable ink on demand. As the droplets of UV-curable ink are applied to the substrate, an ultraviolet light source located proximal the printer head of the inkjet printer exposes the UV-curable ink to ultraviolet light rays to polymerize or cure the UV-curable ink and bond it to the substrate. In regards to the above-mentioned UV inkjet printer, it is noted that UV inkjet printing hardware is commercially available from a number of sources including 3M Company of Saint Paul, Minn., Mimaki Engineering Co., Ltd of Tokyo, Japan, and Oce N. V. of The Netherlands. I have found that the Oce model 250 is particularly useful. These UV-curable inks are formulated by the various ink suppliers specifically for signage articles intended for outdoor usage. In the case of signage for traffic control, the articles are able to withstand at least one year and more preferably at least three years of weathering, temperature extremes, exposure to moisture ranging from dew to rainstorms, and colorfast stability under sunlight.

After ink jetting the negative image onto the reflective substrate, areas of the reflective metal surface that represent the "white space" or negative portions of the visual design are covered with cured ink, and those areas that will correspond to positive portions remain exposed or not covered. The exposed portions of the reflective surface are then mechanically roughened 36 to render the spectrally reflective surface diffusely reflective. Some exemplary means of mechanical roughening are scuffing, grazing, brushing, scratching, and scrubbing, among others. This operation can be performed by sanding, bead blasting, or abrading with a synthetic pad such as a nylon web impregnated with aluminum oxide abrasive. I find that the well known synthetic Scotch Brite pads sold by the 3M Company are useful to scuff exposed portions of the surface sufficient to alter the reflectance so as to cause a distinct difference between the original reflective polished surface and the scuffed surface. The pads are manually worked across the surface in a unidirectional motion, but can also be moved in two or more directions, or can be circular or random to create a variety of effects. Although the intent is to scuff the surface of the exposed polished metal, one does not need to be selective and only touch the metal. The UV cured ink, having been formulated to withstand harsh climates, is robust enough to withstand the scuffing and not detach from the metal surface or otherwise become degraded. Some roughening or scratching of the ink may occur, but this is inconsequential, and will not alter the appearance of the end product. Mechanical roughening can be performed manually or manually with assist by a portable power tool, or even completely automatic with a dedicated machine. The roughening is typically performed dry, although some type of lubricant may be used if desired. It is important to note that this operation is not intended to remove macro amounts of material from the surface, but merely to render it diffuse, i.e. microscopically rough. It is not necessary to etch or abrade into the surface.

After mechanically roughening the reflective surface, the UV-cured ink needs to be removed 37. Since the ink has been cured and strongly bonds to the metal surface, and since it has been formulated to withstand water and mechanical abuse for years, conventional wisdom dictates that it would require harsh chemicals to remove. Indeed, in the prior art, ink resists have been commonly removed using a plethora of exotic chemicals such as chlorinated solvents, oxygenated solvents, acids, bases, etc. I have found that a novel method to remove the ink jetted UV-cured ink is to impart a very high pressure spray of water 37 onto the ink. A high pressure in excess of approximately 1000 pounds per square inch (PSI), and more preferably in excess of 1500 PSI, imparted by a pressure washer, is sufficient to remove this tenacious ink. The nozzle of the pressure washer is typically aimed at the cured ink at a shallow angle to remove the ink. It is not necessary to heat the water, and no chemicals are needed, with standard tap water from a metropolitan water supply at a neutral pH. As an example, the high pressure spray may be water having a neutral pH and less than 500 ppm total dissolved solids applied at a pressure greater than 1000 pounds per square inch. Once the ink has been pressure-washed off, and the metal article has been dried, the finished graphic design image is revealed 38. The difference in reflection between those portions 44 of the original specular reflective surface and the scuffed portions 42 that are now diffused, creates the visual design, apparent to the human eye, where the diffuse areas form a positive representation of the visual design.

In one alternate embodiment, instead of printing inkjet ink in a negative pattern, the ink is printed in a positive pattern, and the reflective areas form a positive representation of the visual design on a diffuse background. The choice of whether to print a positive pattern of ink or a negative pattern of ink is a design choice left to the practioner.

In another alternate embodiment of the invention, the process of ink jetting, scuffing, and removing the ink with high pressure water spray can optionally 39 be repeated one or more times. These second and subsequent repetitions may use a different version of the visual design that exposes only some of those portions that were previously exposed and abraded. The second mechanical roughening process creates areas that are even more diffuse than those created during the first process, giving those areas greater intensity. Optionally, subsequent processes can also abrade the surface in a direction that is different than the first abrasion direction, for example, orthogonal or random. The surface can be mechanically roughened using a different type of scuffing media. A variety of effects can be achieved by the practioner to create visual designs or graphic images on a reflective metal surface.

In yet other alternate embodiments of the invention shown in FIG. 6, the process described herein can be used create articles of manufacture, such as metal doors 62, metal drawers 64, metal cabinets, etc.

In summary, a method for creating a graphic image on a reflective metal surface utilizes a digital representation of the graphic image that is printed by an inkjet printer onto a reflective metal surface. The exposed portions of the reflective metal surface that are not covered with the ink are mechanically scuffed to render them less reflective and visually distinct from the covered portions. The ink is durable enough to withstand the brief scuffing imparted by the Scotch Brite pads or other scuffing implements. The ultraviolet light curable ink is then removed with a high pressure water spray to reveal a graphic image formed by the contrast between the original reflective metal surface and the scuffed metal surface.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of creating a graphic image on a two dimensional metal surface, comprising:

providing a two dimensional metal substrate having a smooth shiny surface;

providing a digital representation of the graphic image resident in a computer memory to an inkjet printer;

printing ultraviolet light curable ink onto the smooth shiny surface using the inkjet printer, wherein those portions of the smooth shiny surface not covered with the ink remain exposed;

mechanically roughening the exposed portions of the smooth shiny surface sufficient to cause those portions to be visually distinct from portions covered by the ink; and removing the ultraviolet light curable ink using a high pressure water spray to reveal the graphic image roughened on the smooth shiny surface, wherein the high pressure water spray comprises a pressure greater than 1000 pounds per square inch.

2. The method as described in claim 1, wherein mechanically roughening comprises roughening the exposed portions by scuffing, grazing, brushing, scratching, scrubbing, sanding, bead blasting, or abrading.

3. The method as described in claim 1, wherein mechanically roughening further comprises mechanically roughening at least some portions of the printed ultraviolet light curable ink.

4. The method as described in claim 1, wherein the smooth shiny surface is not chemically etched to create the graphic image.

5. The method as described in claim 1, wherein after removing the ink, ultraviolet light curable ink is again printed onto the smooth shiny surface, exposed portions are mechanically roughened, and the ink is removed, to create areas of greater intensity.

6. The method as described in claim 1, wherein printing ultraviolet light curable ink comprises printing a negative image of the visual design.

7. A method of creating a visual design on a metal surface, comprising:

providing a substantially planar metal substrate having a substantially specular reflective surface;

printing ink jettable ink onto the planar metal substrate with an inkjet printer to cover portions of the surface with the ink to create a negative image of the visual design, leaving other portions of the surface exposed;

mechanically altering the exposed portions of the surface; and removing the ink with a spray consisting of water to reveal the visual design, wherein removing the ink comprises a high pressure water spray greater than 1000 pounds per square inch.

8. The method as described in claim 7, wherein the ink jettable ink comprises ultraviolet light curable ink.

9. The method as described in claim 7, wherein mechanically altering comprises scuffing, grazing, brushing, scratching, scrubbing, or roughening the exposed portions with a synthetic pad comprising a nylon web impregnated with aluminum oxide abrasive.

10. The method as described in claim 7, wherein mechanically altering comprises an operation performed manually or manually with assist by a portable power tool.

11. The method as described in claim 7, wherein the substantially specular reflective surface is not chemically etched to create the visual design.

12. A method of creating a visual design, comprising:

providing a metal substrate having a polished surface;

printing UV curable ink jettable ink onto the substrate with an inkjet printer to cover portions of the polished surface with the ink and curing the ink, leaving other portions of the polished surface exposed;

mechanically scuffing the exposed portions of polished surface sufficient to render those portions optically different than the portions of the polished surface covered with the ink; and removing the UV curable ink with a high pressure spray consisting of water to reveal the visual design, wherein the high pressure water spray comprises a pressure greater than 1000 pounds per square inch.

13. The method as described in claim 12, wherein the high pressure spray comprises water having a neutral pH and less than 500 ppm total dissolved solids.

14. The method as described in claim 12, wherein the visual design is created on a door or drawer.

15. The method as described in claim 12, wherein mechanically scuffing renders the polished surface diffuse.

16. The method as described in claim 12, wherein printing, mechanically scuffing, and removing are repeated to create areas of greater intensity.

17. The method as described in claim 12, wherein printing uses halftones.

18. The method as described in claim 12, wherein printing UV curable ink jettable ink comprises printing a negative image of the visual design.

19. A method of creating a visual design, comprising:

providing a metal substrate having a polished surface;

printing UV curable ink jettable ink onto the substrate with an inkjet printer to cover portions of the polished surface with the ink and curing the ink, leaving other portions of the polished surface exposed;

mechanically scuffing the exposed portions of polished surface sufficient to render those portions optically different than the portions of the polished surface covered with the ink, wherein the exposed portions of the polished surface are not chemically etched to create the visual design; and removing the UV curable ink with a high pressure spray consisting of water to reveal the visual design, wherein the high pressure water spray comprises a pressure greater than 1000 pounds per square inch.

* * * * *